(12) United States Patent
Reeves et al.

(10) Patent No.: US 11,966,108 B2
(45) Date of Patent: Apr. 23, 2024

(54) REDUCED BORDER DISPLAYS

(71) Applicant: FLEXENABLE LIMITED, Cambridge (GB)

(72) Inventors: William Reeves, Cambridge (GB); Andrew Robert James Russell, Cambridge (GB); James Harding, Cambridge (GB)

(73) Assignee: FLEXENABLE TECHNOLOGY LIMITED, Cambridge (GB)

( * ) Notice: Subject to any disclaimer, the term of this patent is extended or adjusted under 35 U.S.C. 154(b) by 90 days.

(21) Appl. No.: 17/609,537

(22) PCT Filed: May 5, 2020

(86) PCT No.: PCT/EP2020/062377
§ 371 (c)(1),
(2) Date: Nov. 8, 2021

(87) PCT Pub. No.: WO2020/225236
PCT Pub. Date: Nov. 12, 2020

(65) Prior Publication Data
US 2022/0229325 A1    Jul. 21, 2022

(30) Foreign Application Priority Data

May 8, 2019  (GB) ..................................... 1906509
Jan. 28, 2020 (GB) ..................................... 2001204
Jan. 28, 2020 (GB) ..................................... 2001205

(51) Int. Cl.
G02F 1/1333    (2006.01)
G02F 1/133     (2006.01)
(Continued)

(52) U.S. Cl.
CPC .... *G02F 1/133305* (2013.01); *G02F 1/13306* (2013.01); *G02F 1/133512* (2013.01);
(Continued)

(58) Field of Classification Search
CPC ........... G02F 1/133305; G02F 1/13306; G02F 1/133512; G02F 1/1339
See application file for complete search history.

(56) References Cited

U.S. PATENT DOCUMENTS

2011/0007042 A1*  1/2011  Miyaguchi ............ G02F 1/1368
                                                345/204
2017/0293194 A1   10/2017  Hou
(Continued)

OTHER PUBLICATIONS

International Search Report and Written Opinion dated May 5, 2020 for corresponding International Application No. PCT/EP2020/062377.
(Continued)

*Primary Examiner* — Dung T Nguyen
(74) *Attorney, Agent, or Firm* — TAROLLI, SUNDHEIM, COVELL & TUMMINO L.L.P.

(57) ABSTRACT

An LCD display, comprising an active display area, a backlight to illuminate the active display area, and an LCD display stack. The LCD display stack may comprise a substrate, a liquid crystal layer over the substrate, and liquid crystal cover layer. The substrate, the liquid crystal layer, and the liquid crystal cover layer define a liquid crystal cell. The LCD display stack has an edge seal extending between the substrate and the liquid cover layer, and extends over the active display area and beyond the active display area to bend around an edge of the backlight, such that the edge seal lies beyond the active display area.

19 Claims, 11 Drawing Sheets

(51) Int. Cl.
*G02F 1/1335* (2006.01)
*G02F 1/1339* (2006.01)
*F21V 8/00* (2006.01)
*G02F 1/1345* (2006.01)
*G02F 1/1368* (2006.01)

(52) U.S. Cl.
CPC .......... *G02F 1/1339* (2013.01); *G02B 6/0088* (2013.01); *G02F 1/13454* (2013.01); *G02F 1/1368* (2013.01); *G02F 2201/56* (2013.01); *G02F 2202/28* (2013.01)

(56) References Cited

U.S. PATENT DOCUMENTS

| | | |
|---|---|---|
| 2018/0143482 A1 | 5/2018 | Jin |
| 2019/0072811 A1 | 3/2019 | Higano |

OTHER PUBLICATIONS

GB combined search and examination report for corresponding patent application No. GB1906509.3 dated Oct. 10, 2019.

\* cited by examiner

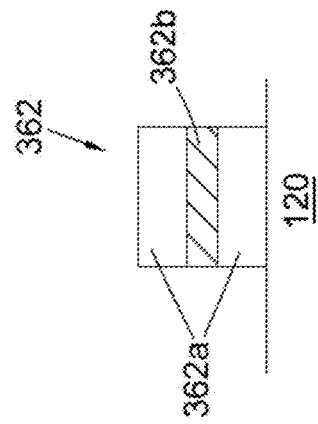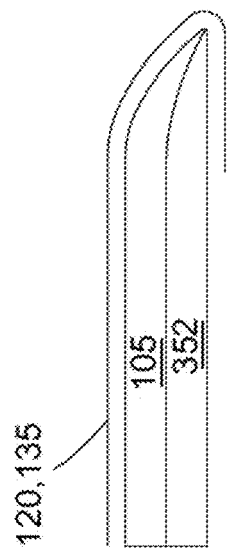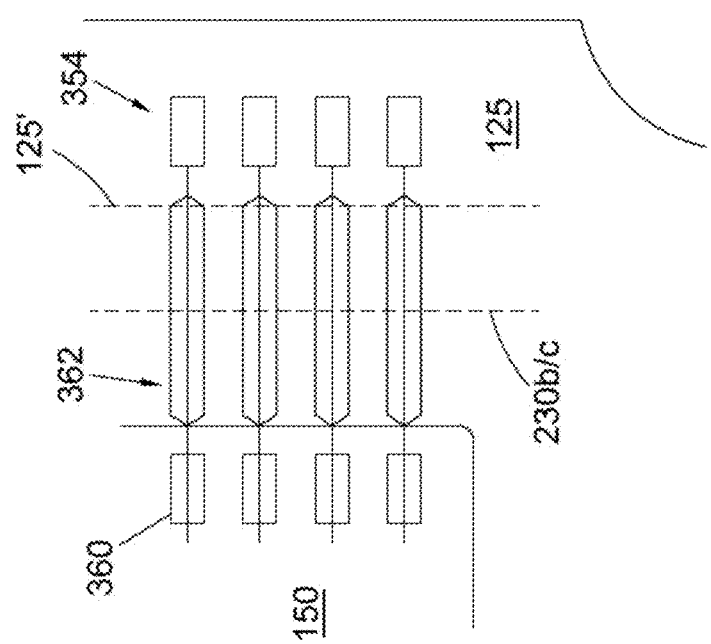

REDUCED BORDER DISPLAYS

RELATED APPLICATIONS

The present invention is a U.S. National Stage under 35 USC 371 patent application, claiming priority to Serial No. PCT/EP2020/062377, filed on 5 May 2020; which claims priority of GB Patent Application No. 1906509.3, filed on 8 May 2019, GB Patent Application No. 2001205.0, filed on 28 Jan. 2020 and GB Patent Application No. 2001204.3, filed on Jan. 28, 2020, the entireties of which are incorporated herein by reference.

FIELD

The invention generally relates to techniques for bezel reduction for LCD displays, in particular flexible LCD displays, and to techniques for implementing curved LCD displays.

BACKGROUND

A display typically comprises an active area, on which information may be displayed, surrounded by an inactive border or bezel that is not usable for information display. There is a general trend, and market pull, for displays with reduced borders/bezels and for curved displays. However, this imposes manufacturing, yield, and reliability challenges.

SUMMARY

Reduced Border Displays

In one aspect there is therefore provided an LCD (Liquid Crystal Display) display, comprising an active display area, a backlight to illuminate the active display area, and an LCD display stack. The LCD display stack may comprise a substrate, a liquid crystal layer over the substrate, and liquid crystal cover layer. The substrate, the liquid crystal layer, and the liquid crystal cover layer define a liquid crystal cell. In implementations the LCD display stack has an edge seal extending between the substrate and the liquid cover layer.

In implementations the LCD display stack extends over the active display area and beyond the active display area to bend around an edge of the backlight, such that the edge seal lies beyond the active display area.

That is, in implementations the liquid crystal cell, i.e. a region of the LCD display stack in which there is liquid crystal (LC) material between the substrate and the cover layer, and/or the edge seal, curve around the edge of the backlight.

Counterintuitively, as described in more detail later, it has been found advantageous to bend the complete LCD display stack around the edge of the backlight, rather than reducing the numbers of layers to a minimum i.e. to just the substrate.

In some implementations the LCD cell bends around an edge of the backlight. This allows the cover layer and substrate to move laterally (in a surface of the display) with respect to one another, because there is LC material between these layers. For similar reasons, in some implementations the edge seal lies behind the backlight.

As described later, in some implementations the LCD display stack may be bent through 180 degrees and e.g. fastened to a rear of the backlight or to a rear of a backlight support/tray. In some other implementations the LCD display stack may be bent through an angle of less than 180 degrees, e.g. 130-170 degrees, to reduce stress within the stack. Nonetheless in such implementations some of the display stack still lies behind the backlight.

Locating the edge seal behind the backlight also facilitates pulling the display stack around a tight radius and securely retaining the stack, because this facilitates robust attachment of the display stack. Thus in implementations the LCD display stack is attached to a rear of the backlight (or another rear face of the display) by an adhesive layer and the edge seal and adhesive layer overlap laterally.

Some implementations of the display may incorporate integrated gate drive (IGD) circuitry. In broad terms this is circuitry, e.g. memory or shift register circuitry, which facilitates addressing pixels of the display with a reduced number of lines (electrical connections). For example such IGD circuitry may be located on the substrate adjacent an edge of the active area of the display and may have a plurality of row or column lines (electrode connections) leading to pixels of the display for driving the display. The IGD circuitry may have a smaller number of lines, e.g. one or more serial data connections, to receive data for driving the pixels of the display. Thus such IGD circuitry may substantially reduce a number of external connections needed by external drive/control circuitry, and can also facilitate a coarser spacing of such external connections.

Although the general term for such circuitry is integrated gate drive (IGD) circuitry here the term is used broadly to encompass other types of circuitry which may be used in a similar way, e.g. any type of circuitry e.g. on one or more integrated circuit dies, typically positioned adjacent an edge of the active display area. For example integrated gate drive circuitry may sometimes be referred to as GIP (Gate In Panel) circuitry when formed by the GIP method in which gate drive integrated circuits are provided directly on the display panel.

In some implementations the IGD circuitry is mounted on the substrate but moved away from the edge of the active display area and around the bend to a region where the substrate, i.e. display stack, is substantially planar, lengthening the connections between the display pixels and the IGD circuitry. For example in some implementations the edge seal, adhesive layer, and IGD circuitry all overlap. This is not essential but reduces the risk of failure of devices, and hence can increase reliability and yield.

Thus in some implementations the IGD circuitry is displaced away from the active display area.

Electrical connections between the IGD circuitry and the active display area (display pixels) may comprise a stack of electrically conducting layers including at least a first, compliant layer of first metal and a second protective layer of second metal. For example, the electrical connections may have a sandwich structure in which the layer of first metal is sandwiched between layers of second metal. In implementations a compliance of the first metal is greater than a compliance of the second metal. For example, the first metal may comprise aluminium, or gold. In implementations an oxidation resistance of the second metal is greater than an oxidation resistance of the first metal. For example, the second metal may comprise molybdenum.

Also or instead, the electrical connections between the IGD circuitry and the active display area (display pixels) may fan out into multiple connections over the bend (and then fan back into a single connection).

Both these approaches can improve the flexibility of the connections.

In implementations one or more encapsulation layers encapsulate the liquid crystal cell, e.g. below the substrate and above the cover layer, extending over the active display area. However, one or both of these may extend over the active display area and beyond the active display area to bend around an edge of the backlight. This can simplify manufacture and improve protection of the LC cell. Also or instead the LCD display stack may be embedded in an encapsulation material such as epoxy where the LCD display stack bends around the edge of the backlight, and optionally up to or beyond where the edge seal begins.

Typically the backlight is attached to the display stack by a thin strip of adhesive around the edge of the backlight. However, this obscures light from the backlight and can thus require a small non-active border for the active display area. Some implementations may omit the strip of adhesive along the edge of the backlight adjacent the bend. However, this can result in a bright line along the edge of the active display area due to light leakage. Light may also leak from the bend in the display stack.

Thus in some implementations the LCD display stack has a light-blocking layer which is substantially continuous over a region of the LCD display stack where the LCD display stack bends around an edge of the backlight, to inhibit light from the backlight leaking out. This light-blocking layer may be formed from the same layer of material used to form colour filters in a colour LCD display, e.g. a resist layer, coloured black (i.e. light absorbing).

In some implementations a backlight tray is provided to hold the backlight. In some implementations the backlight tray may be integrally formed with the backlight.

In some implementations the LCD display stack bends around and abuts a curved edge of the backlight tray, and may be adhesively bonded to this curved edge. This can help to impart stability and robustness to the display.

In some implementations the backlight tray is configured to absorb light from the backlight at the edge of the backlight tray, e.g. by incorporating a light absorbing (black) material, which inhibits the appearance of a bright edge to the display. Also or instead, the backlight tray may be refractive index matched to the backlight and/or an interface between the backlight tray and the backlight may include a refractive index material. Both these techniques can reduce stray light emissions from the display. This is especially so where the display stack/LC cell blocks light from passing through the stack in the bend region, e.g. because it includes a light-blocking layer.

In some implementations the backlight is an edge-lit backlight and includes a light guide to distribute light from an edge of the light guide over the active display area. Then the light guide and backlight tray may integrally formed e.g. from polymer such as PMMA.

In some implementations a radius of the bend decreases around the bend from the active display area towards a rear of the display. For example the display stack may curve gently around to the rear of the display, and then bend sharply e.g. to attached to the rear of the backlight (or another rear face of the display). Then an edge of the backlight or, where present, of a backlight tray, may conform to the bend. That is an edge of the backlight or backlight tray may be shaped to define the shape of the display stack around bend (whilst still functioning as a backlight). This can help to control the shape of the edge of the display, whilst also increasing robustness and manufacturability.

In some implementations the LCD display is rectangular and the LCD display stack bends around at least two adjacent lateral edges of the backlight/rectangle. The LCD display stack may be necked or notched at the corners, i.e. at one or more corners defined by the at least two adjacent lateral edges of the rectangle.

Zero Border Displays

In one aspect there is therefore provided a zero-bezel LCD display, i.e. configured to provide a flat display area with all display edges borderless such that displayed information is able to extend over all (i.e. each) of the display edges. The LCD (Liquid Crystal Display) display may comprise a flexible active matrix LCD display stack. The display stack may comprise a flexible substrate bearing active matrix circuitry comprising an array of TFTs (thin film transistors) for controlling pixels of the display. The display stack may further comprise a liquid crystal layer over the substrate. The display stack may further comprise a liquid crystal cover layer. The flexible substrate, the liquid crystal layer, and the liquid crystal cover layer may define a liquid crystal cell. The flexible active matrix LCD display stack may define an active display area. The LCD display may further comprise a backlight behind the flexible active matrix LCD display stack to illuminate the active display area. In implementations, the flexible substrate of the flexible active matrix LCD display stack (including the substrate) is notched at each corner of the flat display area and is folded around (i.e. bends around) each of the edges of the flat display area such that the active display area extends around each of the edges of the flat display area of the zero-bezel LCD display.

In this way, an "infinity" display may be created in which the displayed information extends around each of the edges of the display.

In implementations the display area is rectangular (which here includes square), with four orthogonal display edges. The backlight may thus also be rectangular.

In implementations the notch at each corner may be defined by a concave contour or curve in the flexible substrate (and optionally the rest of the display stack) at the corner. When configured as a zero-bezel LCD display this contour may define a concave contour at each corner of the active display area. In implementations the notch at each corner may be defined by a straight line across the corner when configured as a zero-bezel LCD display.

In implementations the notches in the flexible substrate at the corners of the flat display area define a contour, e.g. a concave contour, which cuts off each corner of the flat display area. An edge of the active display area at each corner may then define a convex curve on the flat display area which is displaced away from the concave contour at a point of closest approach of the concave contour and convex curve. The active display area may be defined e.g. by the display stack or part thereof e.g. the array of TFTs.

This may facilitate manufacture and increase yield as there is a single point of closest approach of the curves, which have opposite senses, which can facilitate tolerancing and manufacture control, thus also facilitating bringing the two curves close to one another.

In implementations the LCD display stack extends over the active display area and beyond the active display area to bend around an edge of the backlight. The flexible active matrix LCD display stack may have an edge seal extending between the substrate and the liquid cover layer. The edge seal may lie beyond the active display area. That is, in implementations the liquid crystal cell, i.e. a region of the LCD display stack in which there is liquid crystal (LC) material between the substrate and the cover layer, and/or the edge seal, curve around the edge of the backlight.

Counterintuitively, as described in more detail later, in some implementations it has been found advantageous to bend the complete LCD display stack around the edge of the backlight, rather than reducing the numbers of layers to a minimum i.e. to just the substrate.

In some implementations the LCD cell bends around an edge of the backlight. This allows the cover layer and substrate to move laterally (in a surface of the display) with respect to one another, because there is LC material between these layers. For similar reasons, in some implementations the edge seal lies behind the backlight.

As described later, in some implementations the LCD display stack may be bent through 180 degrees and e.g. fastened to a rear of the backlight or to a rear of a backlight support/tray. In some other implementations the LCD display stack may be bent through an angle of less than 180 degrees, e.g. 130-170 degrees, to reduce stress within the stack. Nonetheless in such implementations some of the display stack still lies behind the backlight.

Locating the edge seal behind the backlight also facilitates pulling the display stack around a tight radius and securely retaining the stack, because this facilitates robust attachment of the display stack. Thus in implementations the LCD display stack is attached to a rear of the backlight (or another rear face of the display) by an adhesive layer and the edge seal and adhesive layer overlap laterally.

Some implementations of the display may incorporate integrated gate drive (IGD) circuitry. In broad terms this is circuitry, e.g. memory or shift register circuitry, which facilitates addressing pixels of the display with a reduced number of lines (electrical connections). For example such IGD circuitry may be located on the substrate adjacent an edge of the active area of the display and may have a plurality of row or column lines (electrode connections) leading to pixels of the display for driving the display. The IGD circuitry may have a smaller number of lines, e.g. one or more serial data connections, to receive data for driving the pixels of the display. Thus such IGD circuitry may substantially reduce a number of external connections needed by external drive/control circuitry, and can also facilitate a coarser spacing of such external connections.

Although the general term for such circuitry is integrated gate drive (IGD) circuitry here the term is used broadly to encompass other types of circuitry which may be used in a similar way, e.g. any type of circuitry e.g. on one or more integrated circuit dies, typically positioned adjacent an edge of the active display area. For example integrated gate drive circuitry may sometimes be referred to as GIP (Gate In Panel) circuitry when formed by the GIP method in which gate drive integrated circuits are provided directly on the display panel.

In some implementations the IGD circuitry is mounted on the substrate but moved away from the edge of the active display area and around the bend to a region where the substrate, i.e. display stack, is substantially planar, lengthening the connections between the display pixels and the IGD circuitry. For example in some implementations the edge seal, adhesive layer, and IGD circuitry all overlap. This is not essential but reduces the risk of failure of devices, and hence can increase reliability and yield.

Thus in some implementations the IGD circuitry is displaced away from the active display area. For example the flexible substrate may extend laterally beyond the flexible active matrix LCD display stack to define one or more tabs at each of two, e.g. orthogonal, edges of the flat, e.g. rectangular display area. Then the IGD circuitry may be mounted on each of the one or more tabs. In implementations each of the one or more tabs is connected to a region of the flexible substrate in (beneath) the active display area via a necked region in which a lateral width of the tab diminishes.

Electrical connections between the IGD circuitry and the active display area (display pixels) may comprise a stack of electrically conducting layers including at least a first, compliant layer of first metal and a second protective layer of second metal. For example the electrical connections may have a sandwich structure in which the layer of first metal is sandwiched between layers of second metal. In implementations a compliance of the first metal is greater than a compliance of the second metal. For example the first metal may comprise aluminium, or gold. In implementations an oxidation resistance of the second metal is greater than an oxidation resistance of the first metal. For example, the second metal may comprise molybdenum.

Also or instead, the electrical connections between the IGD circuitry and the active display area (display pixels) may fan out into multiple connections over the bend (and then fan back into a single connection).

Both these approaches can improve the flexibility of the connections.

In implementations one or more encapsulation layers encapsulate the liquid crystal cell, e.g. below the substrate and above the cover layer, extending over the active display area. However, one or both of these may extend over the active display area and beyond the active display area to bend around an edge of the backlight. This can simplify manufacture and improve protection of the LC cell. Also or instead the LCD display stack may be embedded in an encapsulation material such as epoxy where the LCD display stack bends around the edge of the backlight, and optionally up to or beyond where the edge seal begins.

Typically, the backlight is attached to the display stack by a thin strip of adhesive around the edge of the backlight. However, this obscures light from the backlight and can thus require a small non-active border for the active display area. Some implementations may omit the strip of adhesive along the edge of the backlight adjacent the bend. However this can result in a bright line along the edge of the active display area due to light leakage. Light may also leak from the bend in the display stack.

Thus in some implementations the LCD display stack has a light-blocking layer which is substantially continuous over a region of the LCD display stack where the LCD display stack bends around an edge of the backlight, to inhibit light from the backlight leaking out. This light-blocking layer may be formed from the same layer of material used to form colour filters in a colour LCD display, e.g. a resist layer, coloured black (i.e. light absorbing).

In some implementations a backlight tray is provided to hold the backlight. In some implementations the backlight tray may be integrally formed with the backlight.

In some implementations, the LCD display stack bends around and abuts a curved edge of the backlight tray, and may be adhesively bonded to this curved edge. This can help to impart stability and robustness to the display.

In some implementations the backlight tray is configured to absorb light from the backlight at the edge of the backlight tray, e.g. by incorporating a light absorbing (black) material, which inhibits the appearance of a bright edge to the display. Also or instead the backlight tray may be refractive index matched to the backlight and/or an interface between the backlight tray and the backlight may include a refractive index material. Both these techniques can reduce stray light emissions from the display. This is especially so where the display stack/LC cell blocks light from passing through the stack in the bend region, e.g. because it includes a light-blocking layer.

In some implementations the backlight is an edge-lit backlight and includes a light guide to distribute light from an edge of the light guide over the active display area. Then the light guide and backlight tray may integrally formed e.g. from polymer such as PMMA.

In some implementations a radius of the bend decreases around the bend from the active display area towards a rear of the display. For example the display stack may curve gently around to the rear of the display, and then bend sharply e.g. to attached to the rear of the backlight (or another rear face of the display). Then an edge of the backlight or, where present, of a backlight tray, may conform to the bend. That is an edge of the backlight or backlight tray may be shaped to define the shape of the display stack around bend (whilst still functioning as a backlight). This can help to control the shape of the edge of the display, whilst also increasing robustness and manufacturability.

The approaches described herein may be used with direct lit or edge lit backlighting.

"Zero Border Displays" implementations described above may be combined with the "Reduced Border Displays" described above.

Curved Displays

In one aspect there is therefore provided a flexible LCD (Liquid Crystal Display) display to provide a curved display area. The curved display area has display edges and may be curved about one, two or more axes. The flexible LCD display may comprise a flexible active matrix LCD display stack. The flexible active matrix LCD display stack may comprise a flexible substrate bearing active matrix circuitry comprising an array of TFTs (thin film transistors) for controlling pixels of the display. The flexible active matrix LCD display stack may further comprise a liquid crystal layer over the substrate, and a liquid crystal cover layer. The flexible substrate, the liquid crystal layer, and the liquid crystal cover layer may define a liquid crystal cell. The flexible active matrix LCD display stack may have an edge seal extending between the substrate and the liquid cover layer. The flexible active matrix LCD display stack may define an active display area.

The flexible LCD display may further comprise drive circuitry, e.g. IGD (integrated gate drive) circuitry, for driving the active matrix circuitry. The flexible substrate may extend laterally beyond the flexible active matrix LCD display stack to define one or more tabs at each of two adjacent, e.g. orthogonal, edges of the curved display area, and the drive circuitry may be mounted on each of the one or more tabs. Each of the one or more tabs may be connected to a region of the flexible substrate in (i.e. beneath) the active display area via a necked region in which a lateral width of the tab diminishes.

In some implementations the flexible substrate defines a plurality of tabs at a first of the two adjacent edges. This first edge is curved, and the flexible active matrix LCD display stack is curved about an axis which may be parallel to the second of the two adjacent edges. In implementations, for at least the tabs at the first of the two adjacent edges, the necked region includes a compliant structure, e.g. a fold, and has notches at corners where the necked region joins the flexible substrate. In some implementations the flexible active matrix LCD display stack is curved to define a cylindrical display, e.g. with the shape of a circular cylinder or elliptic cylinder. Taken collectively these features facilitate manufacture of a curved e.g. cylindrical display with improved reliability and manufacturing yield.

In some implementations the active display area is rectangular, with four orthogonal edges. However, the active display area may have other shapes e.g. a triangular, octagonal, or other polygonal shape. In implementations the above described features allow the active display area to be formed into complex convex and/or concave shapes, optionally with multiple curves e.g. curves about multiple different axes.

The flexible active matrix LCD display stack may be curved such that two opposite edges of the active display area (typically straight edges) abut along a line, i.e. a join line, in particular where the active display area is rectangular. The LCD display stack (including the substrate) may be notched at each end of one or both of the two opposite edges (i.e. at the corners) and folded around respectively one or both of the two opposite edges, to reduce an inactive area of a cylindrical display in a strip along the join line. In particular, the LCD display stack may be notched at each end of both the two opposite edges and folded around both of the two opposite edges, such that the active display area abuts along the opposite, e.g. straight, edges (which may be parallel to an axis of the cylinder) to define a substantially continuous active display area extending around a circumference of the cylindrical display.

Some implementations of the display may incorporate integrated gate drive (IGD) circuitry. In broad terms this is circuitry, e.g. memory or shift register circuitry, which facilitates addressing pixels of the display with a reduced number of lines (electrical connections). For example such IGD circuitry may be located on the substrate adjacent an edge of the active area of the display and may have a plurality of row or column lines (electrode connections) leading to pixels of the display for driving the display. The IGD circuitry may have a smaller number of lines, e.g. one or more serial data connections, to receive data for driving the pixels of the display. Thus, such IGD circuitry may substantially reduce a number of external connections needed by external drive/control circuitry, and can also facilitate a coarser spacing of such external connections. This in turn can facilitate a curved LCD display.

Although the general term for such circuitry is integrated gate drive (IGD) circuitry here the term is used broadly to encompass other types of circuitry which may be used in a similar way, e.g. any type of circuitry e.g. on one or more integrated circuit dies, typically positioned adjacent an edge of the active display area. For example integrated gate drive circuitry may sometimes be referred to as GIP (Gate In Panel) circuitry when formed by the GIP method in which gate drive integrated circuits are provided directly on the display panel.

In some implementations the drive circuitry comprises one or more integrated circuits i.e. IGD integrated circuits. The flexible LCD display may further comprise a rigid interconnect structure (i.e. stiffer than the flexible substrate), mounted on each of the tabs bearing the one or more integrated circuits and optionally having an edge connector for making an external electrical connection to the LCD display. In some arrangements e.g. where the curved display is bent around a very tight curve, successive interconnect structures may alternate above and then below adjacent interconnect structures along the curve. In some other arrangements multiple interconnect structures may define a plane and connect to a common interconnect PCB (Printed Circuit Board). In some implementations, rather than being mounted on an interconnect structure the IGD integrated circuits may be mounted directly onto the flexible substrate.

In implementations the IGD circuitry is mounted on the substrate but moved away from the edge of the active display area and around the bend to a region where the underlying substrate is substantially planar, lengthening the connections between the display pixels and the IGD circuitry. For example in some implementations the edge seal, adhesive layer, and IGD circuitry all overlap. This reduces the risk of failure of devices, and hence can increase reliability and yield.

Electrical connections between the IGD circuitry and the active display area (display pixels) may comprise a stack of electrically conducting layers including at least a first, compliant layer of first metal and a second protective layer of second metal. For example, the electrical connections may have a sandwich structure in which the layer of first metal is sandwiched between layers of second metal. In implementations a compliance of the first metal is greater than a compliance of the second metal. For example, the first metal may comprise aluminium, or gold. In implementations an oxidation resistance of the second metal is greater than an oxidation resistance of the first metal. For example, the second metal may comprise molybdenum. This can improve the flexibility of the connections.

Also or instead, the electrical connections between the IGD circuitry and the active display area (display pixels) may fan out into multiple connections in the necked region i.e. over the bend, and may then fan back into a single connection. This can also improve the flexibility of the connections.

In some implementations the flexible active matrix LCD display stack is curved about an axis. The flexible LCD display may further comprise a backlight behind the flexible active matrix LCD display stack to illuminate the active display area. The backlight may be curved to confirm to the curvature of the flexible active matrix LCD display stack.

Counterintuitively, as described in more detail later, in some implementations it has been found advantageous to bend the complete LCD display stack around the edge of the backlight, rather than reducing the numbers of layers to a minimum i.e. to just the substrate.

In some implementations the LCD cell bends around an edge of the backlight. This allows the cover layer and substrate to move laterally (in a surface of the display) with respect to one another, because there is LC material between these layers. For similar reasons, in some implementations the edge seal lies behind the backlight.

As described later, in some implementations the LCD display stack may be bent through 180 degrees and e.g. fastened to a rear of the backlight or to a rear of a backlight support/tray. In some other implementations the LCD display stack may be bent through an angle of less than 180 degrees, e.g. 130-170 degrees, to reduce stress within the stack. Nonetheless in such implementations some of the display stack still lies behind the backlight.

Locating the edge seal behind the backlight also facilitates pulling the display stack around a tight radius and securely retaining the stack, because this facilitates robust attachment of the display stack. Thus, in implementations the LCD display stack is attached to a rear of the backlight (or another rear face of the display) by an adhesive layer and the edge seal and adhesive layer overlap laterally.

In implementations one or more encapsulation layers encapsulate the liquid crystal cell, e.g. below the substrate and above the cover layer, extending over the active display area. However, one or both of these may extend over the active display area and beyond the active display area to bend around an edge of the backlight. This can simplify manufacture and improve protection of the LC cell. Also or instead the LCD display stack may be embedded in an encapsulation material such as epoxy where the LCD display stack bends around the edge of the backlight, and optionally up to or beyond where the edge seal begins.

Typically, the backlight is attached to the display stack by a thin strip of adhesive around the edge of the backlight. However, this obscures light from the backlight and can thus require a small non-active border for the active display area. Some implementations may omit the strip of adhesive along the edge of the backlight adjacent the bend. However, this can result in a bright line along the edge of the active display area due to light leakage. Light may also leak from the bend in the display stack.

Thus in some implementations the LCD display stack has a light-blocking layer which is substantially continuous over a region of the LCD display stack where the LCD display stack bends around an edge of the backlight, to inhibit light from the backlight leaking out.

This light-blocking layer may be formed from the same layer of material used to form colour filters in a colour LCD display, e.g. a resist layer, coloured black (i.e. light absorbing).

In some implementations a backlight tray is provided to hold the backlight. In some implementations the backlight tray may be integrally formed with the backlight.

In some implementations the LCD display stack bends around and abuts a curved edge of the backlight tray, and may be adhesively bonded to this curved edge. This can help to impart stability and robustness to the display.

In some implementations the backlight tray is configured to absorb light from the backlight at the edge of the backlight tray, e.g. by incorporating a light absorbing (black) material, which inhibits the appearance of a bright edge to the display. Also or instead, the backlight tray may be refractive index matched to the backlight and/or an interface between the backlight tray and the backlight may include a refractive index material. Both these techniques can reduce stray light emissions from the display. This is especially so where the display stack/LC cell blocks light from passing through the stack in the bend region, e.g. because it includes a light-blocking layer.

In some implementations the backlight is an edge-lit backlight and includes a light guide to distribute light from an edge of the light guide over the active display area. Then the light guide and backlight tray may integrally formed e.g. from polymer such as PMMA.

In some implementations a radius of the bend decreases around the bend from the active display area towards a rear of the display. For example the display stack may curve gently around to the rear of the display, and then bend sharply e.g. to attached to the rear of the backlight (or another rear face of the display). Then an edge of the backlight or, where present, of a backlight tray, may conform to the bend. That is an edge of the backlight or backlight tray may be shaped to define the shape of the display stack around bend (whilst still functioning as a backlight). This can help to control the shape of the edge of the display, whilst also increasing robustness and manufacturability.

In some implementations the LCD display is rectangular and the LCD display stack bends around at least two adjacent lateral edges of the backlight/rectangle. The LCD display stack may be necked or notched at the corners, i.e. at one or more corners defined by the at least two adjacent lateral edges of the rectangle.

"Curved Displays" implementations described above may be combined with the "Reduced Border Displays" described above.

BRIEF DESCRIPTION OF THE DRAWINGS

Embodiments of the invention will be described, by way of example, with reference to the accompanying drawings, in which:

FIGS. 4a and 4b show, respectively, a close-up view of connections between pixels and IGD circuitry, and a cross-sectional view through a connection structure.

FIG. 5 shows an example of a display with a changing bend radius.

In the figures, like elements are indicated by like reference numerals.

DETAILED DESCRIPTION OF EMBODIMENTS

Figure 1:
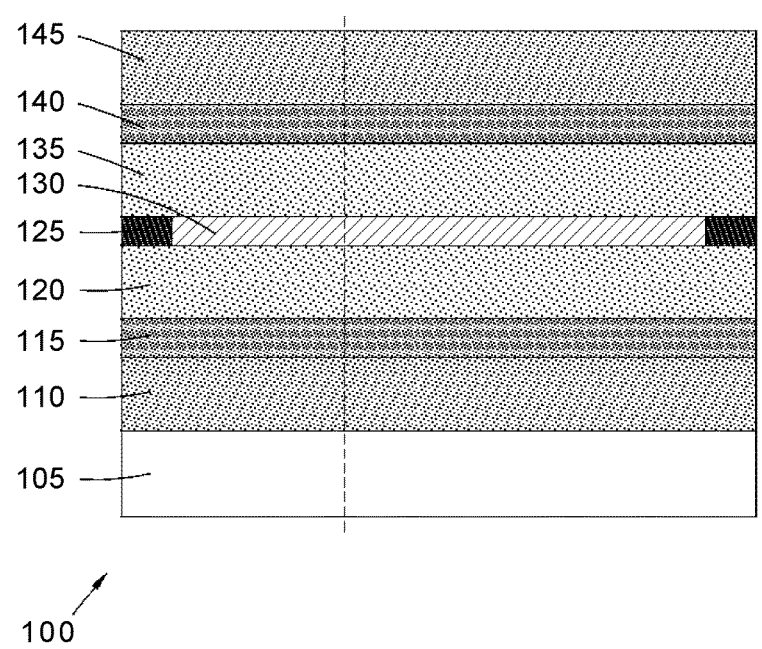
FIG. 1 shows an example LCD display stacks.

FIG. 1 illustrates a schematic cross-sectional view of an example LCD (liquid crystal display) display stack 100. In the example display, stack liquid crystal (LC) material 130 is disposed between a substrate 120 and a liquid crystal (LC) cover layer 135. The substrate layer 120 may also carry electrical connections, such as row and column and interconnect lines of the display, and control circuitry (not shown), for example thin film transistors (TFTs), for pixels of the display. In some implementations, e.g. for flexible displays, the TFTs may be organic.

Each of the substrate 120 and LC cover layer 135 may be provided with a respective encapsulation layer 115, 140. An edge seal 125 is provided between the substrate and LC cover layer 120, 135, in the example shown on each edge of the LC material 130, to seal and protect the liquid crystal material.

A sheet of LCD display stack comprising the substrate, LC cover layer, and LC material may be referred to as an LC cell; as described herein the LCD display stack extends beyond the edges of the LC cell and includes the edge seal.

An LCD display stack will typically include one or more polarizing layers. Thus in the structure of FIG. 1, a first light polarizing layer 110 is provided below the substrate 120 and a second light polarizing layer 145 is provided above the LC cover layer 135. In some implementations the or each encapsulation layer may be combined with a respective light polarizing layer. In the later description explicit reference to the polarizing layers is sometimes omitted.

A backlight layer 105 is provided below the first light polarizing layer 110. The backlight layer 105 is generally a separate part to the LCD display stack; a polarizer may be built into the backlight. In implementations the backlight incorporates a light guide, for example fabricated from PMMA. For example this may allow the display to be edge-lit e.g. by one or more LEDs. The backlight may also include a diffuser, e.g. a layer of light-diffusing film, over the light guide i.e. between the light guide and the LCD display stack. The light guide may have a back reflector.

The substrate 120 may be a glass substrate or, e.g. in flexible displays, may comprise TAC (Cellulose Triacetate). The LC cover layer 130 may comprise TAC or glass. Where the substrate and/or LC cover layer comprises glass separate encapsulation layers may be omitted. In some applications the LCD display stack may be flexible but the display as a whole may be inflexible.

The LCD display stack may include a colour filter layer (not shown); this may reside on the LC cover layer 135 and may be fabricated from coloured resist material. To reduce parallax it is helpful if the colour filter layer is close to the layer of LC material.

More details of suitable technology can be found on the Applicant's web site and in the Applicant's earlier published patent applications.

Merely be way of illustration a total thickness of the LCD display stack may be less than 1 mm, e.g. a few hundred microns. The substrate and LC cover layer may each have a thickness of e.g. ~40-130 µm; the encapsulation layers may each have a thickness of e.g. ~10 µm; the light polarization layers may each have a thickness of e.g. ~50-60 µm.

Figure 2A:
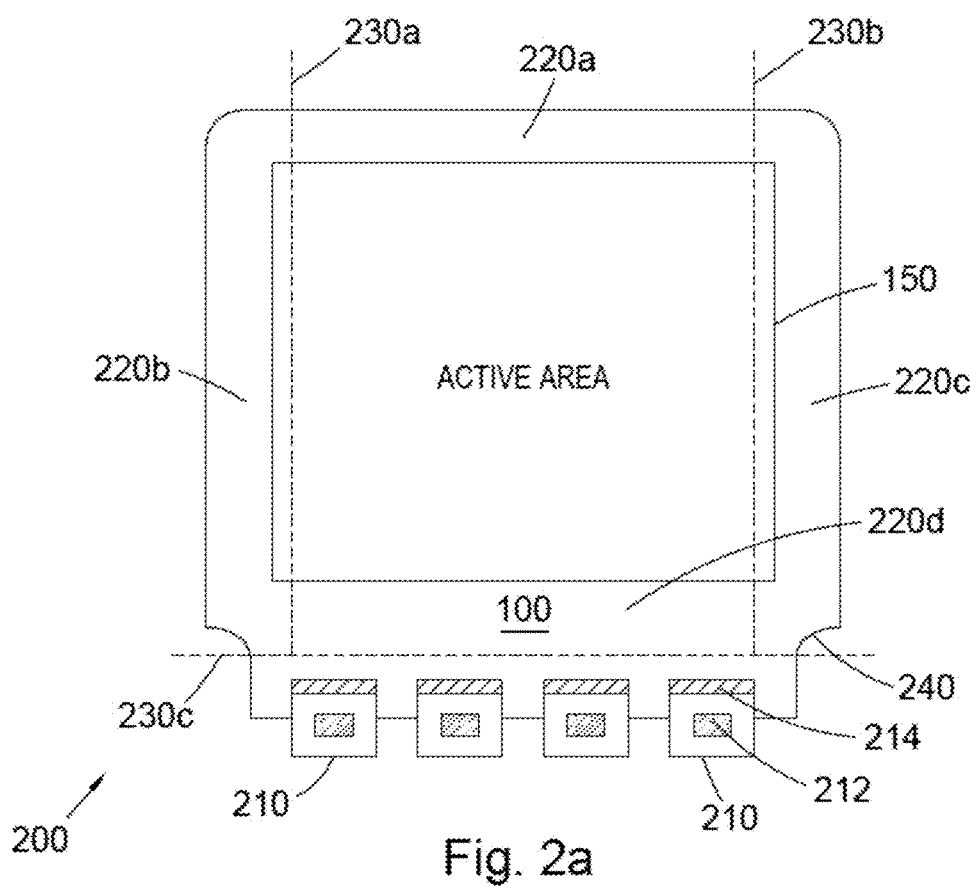
FIGS. 2a and 2b show, respectively, a display assembly for a display, and details of an LCD display curved at two adjacent edges.

FIG. 2a shows a display assembly or panel 200 for a display. The display assembly 200 comprises an LCD display stack 100 having an active e.g. TFT addressable area 150 with pixels for displaying information, and a set of one or more chip-on-film (COF) interconnect structures 210. Each COF interconnect structure 210 comprises, in this example, one or more driver integrated circuits 212 and connects to the LCD display stack 100 via a connection region 214 and, in use, to a PTB (Printed Wire Board) module (not shown) or PCB (Printed Circuit Board) module (not shown).

More particularly, in implementations the COF interconnect structure 210 may have a stiff substrate mounting the driver integrated circuit(s) 212 and mechanically and electrically connected to the flexible substrate 120 via connection region 214. The COF interconnect structure 210 may have an edge connector for connecting to further electronic circuitry on the printed board e.g. a MPWB (Module printed wire board) of a device for which the LCD display stack provides a display.

The driver integrated circuits provide row and/or column drive signals, e.g. gate and/or source drive signals, to the active area 150, either directly, or indirectly via IGD circuitry. The number of row/column lines depends on the resolution of the display; for example it may be of order $>10^3$ for a colour display with red, green, and blue subpixels.

The display stack has non-driveable regions 220a-d surrounding the active area. Typically there are connections to each lateral side of active area 150, in regions 220b,c, and at the bottom, i.e. towards the COF interconnect structures, in region 220d. No connections may be necessary at the top of the active area, in region 220a, which may be narrow e.g. a width of the edge seal there e.g. <1 mm. The connections to each lateral side of the active area can create crowding of the connection lines, which is lessened by using IGD circuitry.

To reduce the bezel size the display stack may be folded along one or more of lines 230a,b,c, to move some of the inactive/non-driven areas out of view e.g. around the back of the display/backlight. Depending upon what folds are made, and where, the LCD display stack may be necked or notched 240 at two or more, e.g. all four corners of the active area.

Figure 2B:
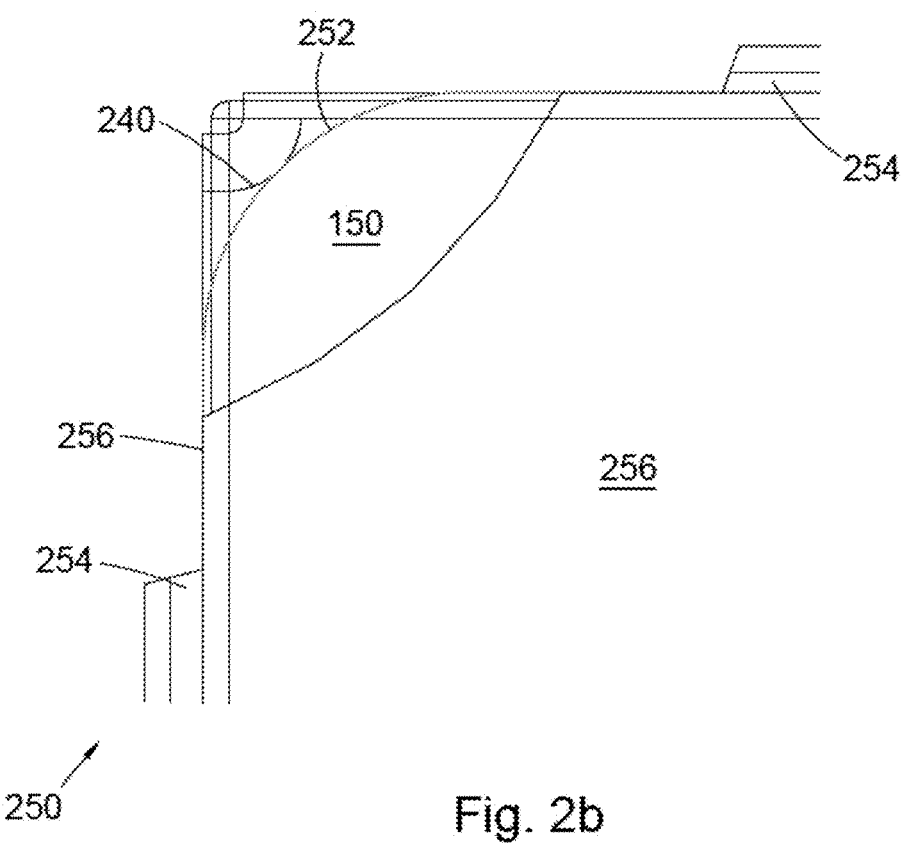

FIG. 2b shows display assembly or panel 250 in which an innermost point of the neck/notch 240 defines a location of two perpendicular folds so that the display stack may be folded around two adjacent edges of the backlight i.e. around adjoining lateral edges of the LCD display. The active area 150 may have a rounded corner 252 to facilitate this. In implementations the innermost point of the neck/notch 240 lies adjacent the active area 150 of the display. The active area 150 may terminate where the curved edge begins, or may continue around one or both adjacent curved edges of the display. In implementations the active area 150 wraps around at least 75 degrees or 90 degrees of the bend radii of the backlight. In this way, in some implementations a rectangular display may be provided with three or four curved edges, to achieve a zero border display.

In the example shown implementations IGD circuitry, e.g. the one or more driver integrated circuits 212, is provided on a tab 254 at each folded edge and may be located behind the display/backlight (in FIG. 2b these tabs are shown unfolded from behind the backlight). In implementations the display panel 250 has a transparent protective layer 256 over the surface of the display which, in a similar manner, may curve around the edges of the display.

Figure 3A:
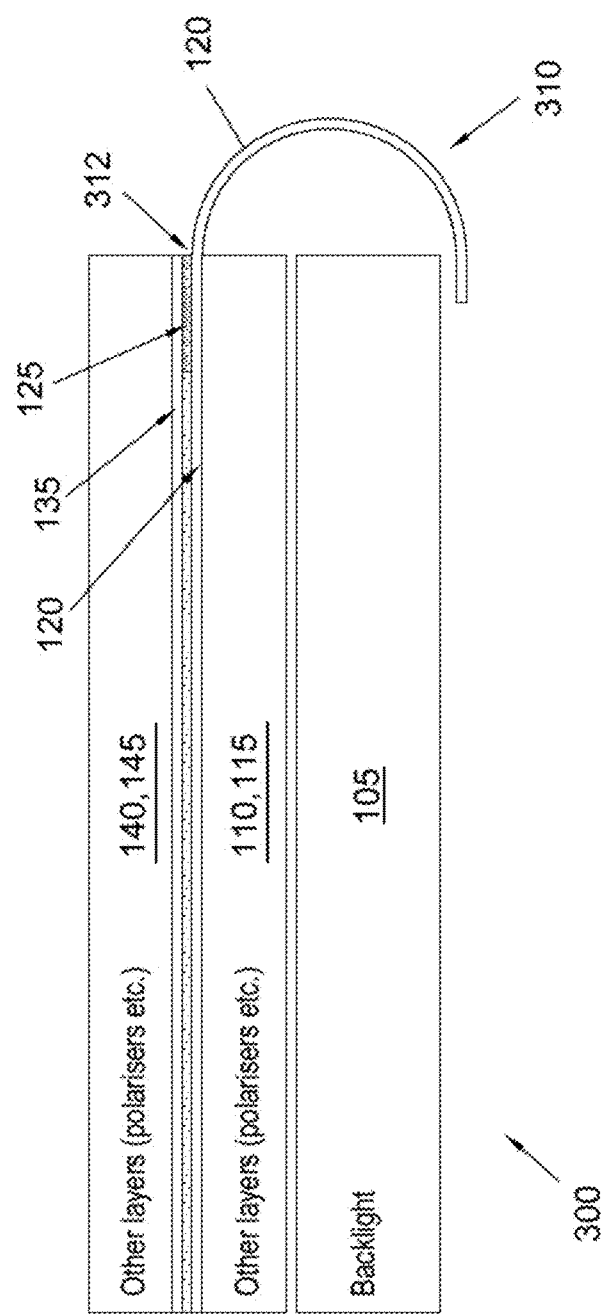
FIGS. 3a and 3b show, respectively, a cross-sectional schematic view of a first display with a reduced bezel, and a cross-sectional schematic view of a display with a reduced bezel according to an embodiment.

FIG. 3a shows a cross-sectional schematic view of a first display 300 with a reduced bezel. In the example of FIG. 3a the LCD display stack 100 is bent around behind the display and backlight and reduced to a minimum thickness in a region of the bend 310 i.e. where the substrate is non-planar. Thus around the bend 310 the display stack is reduced to just the substrate 120, and the interconnects it carries. The edge seal 125 is located at the front of the display where the substrate is planar; the IGD circuitry may be located under the edge seal.

This has been fabricated but in practice exhibits some problems. Bending at the edge of the display, e.g. during manufacture, can cause the edge seal to pull apart at location 312. Also encapsulation can be difficult, and if the LC cover layer 135 is not to be bent the edge seal 125 must be located on the viewable surface which is thus constrained to have some inactive border.

Figure 3B:
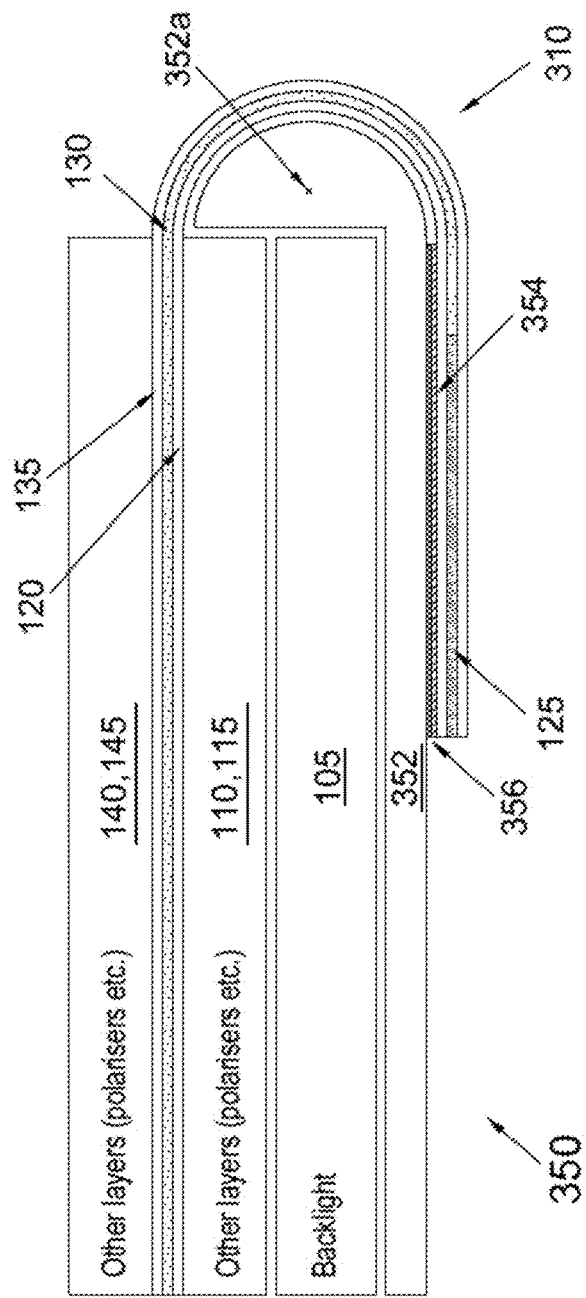

FIG. 3b shows a cross-sectional schematic view of a display 350 with a reduced bezel according to an alternative approach. Counterintuitively this addresses the aforementioned problems by maintaining the complete liquid crystal cell i.e. at least the substrate 120, LC material 130, and LC cover layer 135 around the bend 310 i.e. where the substrate is non-planar. In some implementations the complete LCD display stack (without the light polarizing layers) is maintained around the bend 310.

Thus in the region of the bend the substrate 120 and LC cover layer 135 are separated mostly by the LC material 130 (there may also be spacers at intervals) and can thus slip past one another. This also protects the substrate, which bears the interconnects and potentially other electrical features, in the region of the bend.

In implementations the edge seal 125 is located where the liquid crystal cell ends, e.g. behind the display/backlight and/or where the substrate again becomes planar. This facilitates the substrate 120 and LC cover layer 135 moving past one another at the bend. Locating the edge seal here also reduces bending forces on the seal, reducing the risk of the seal pulling apart and increasing reliability, robustness and yield of the manufactured display.

In implementations the backlight 105 is supported by a backlight tray 352. This may have a curved or rounded edge or end 352a to support and constrain an inner surface of the display stack around the bend 310. In implementations an outer surface of the display stack may be protected by encapsulation e.g. epoxy and/or by a metal e.g. aluminium casing (not shown).

In implementations IGD circuitry 354 may be located behind the display/backlight and/or where the substrate again becomes planar e.g. partially or wholly overlapping the edge seal 125. This helps to reduce stress on the TFTs and on any vias. Connections between the IGD circuitry 354 and the active area 150 of the display may be lengthened, as shown in FIG. 4.

In some implementations some of the electrical connections to control circuitry e.g. for pixels of the display may be multiplexed to reduce the number of electrical connections required, hence facilitating a reduced size border for the active display area. For example, source lines carrying the source drive signals may be multiplexed. In a similar manner connections e.g. source connections, to the LCD display panel may be multiplexed to reduce the number of connections required.

The display stack may be fastened to the rear of the display e.g. to the backlight 105 or backlight tray 352, by a layer of adhesive 356. This may also partially or wholly overlap the edge seal 125. The adhesive layer may extend sufficiently far along the rear of the display to counter the force needed to pull the display stack around the bend.

As illustrated the bend is a 180 degree bend, but the bend may be shallower e.g. of order 150 degrees or less, to reduce stress on the LC cell.

FIG. 4a shows a close-up view of connections 362 between pixels 360 in the active area 150 of the display and the IGD circuitry 354, here located beneath the edge seal 125 (with boundary 125'). As illustrated, the connections fan-out from the active area 150 and back at the IGD circuitry, so that each has multiple connections over the bend 310 to increase robustness and yield. The thickness of the individual connections may also be reduced. Also or instead, the interconnections 362 may include one or more meanders.

FIG. 4b shows a cross-sectional view through an example connection structure. This comprises a compliant layer 362a of metal e.g. aluminium, sandwiched by protective layers 362b of metal e.g. molybdenum to resist oxidation and cracking.

The connections 362 may be fabricated by photolithography.

Referring again to FIG. 3b, light can leak out of the end of the backlight 105 into the backlight tray 352. In implementations the LCD display stack may therefore be configured to block light from passing through. The red, green, and blue filters e.g. of a colour display stack may be surrounded by a black region. The LCD display stack may be configured to block light using the colour filter layer e.g. by extending the black region to be substantially continuous in the region of bend 310.

A backlight may be attached to the display stack by a thin strip of light-blocking adhesive e.g. tape around the perimeter of the upper surface of the backlight. This may be omitted along the edge of the backlight 105 adjacent the bend 310, but this can cause problems such as a bright strip of light at the edge of the display. Thus the rounded edge 352a of the backlight tray may be configured to absorb light e.g. by including a light absorbing (black) material. For example an opacity of the backlight tray may be tuned to absorb enough light to keep the lighting level consistent in the area above the light guide i.e. to attenuate or remove the bright strip e.g. so that the edge of the display is not substantially brighter than a central region of the display. Alternatively, an absorbing strip may be applied to the end of the waveguide.

As well or instead, the backlight tray or its rounded edge may be index matched to a refractive index of the backlight and/or a joint between the backlight tray or its rounded edge and the backlight may incorporate an index matching material e.g. adhesive. The refractive index may be matched to better than 0.2, 0.1 or 0.05.

In implementations the backlight, more specifically the light guide of the backlight, and the backlight tray may be integrally formed—in effect the light guide acts as the backlight tray. This can also reduce stray light leakage and may facilitate extending the active display area around the bend.

Whether or not the backlight tray and backlight are integrally formed, in implementations the rounded edge 352a of the backlight tray may have a physical relief pattern, e.g. formed by micro-embossing, to distribute light output evenly over the bend. This may be used to illuminate the LCD display stack over the bend e.g. to extend the active display area around the bend; and/or this may be used to achieve a more uniform illumination of the active display area e.g. by attenuating or removing the aforementioned bright strip. In some implementations the backlight diffuser may extend partially or wholly around the rounded edge; in other implementations the backlight diffuser may terminate where the rounded edge begins.

FIG. 5 shows an example of a display in which a radius of the bend 310 decreases around the bend from the active display area towards a rear of the display, eventually bending sharply so that it can be attached to the rear of the backlight or backlight tray, guided by the backlight/tray.

Figure 6:
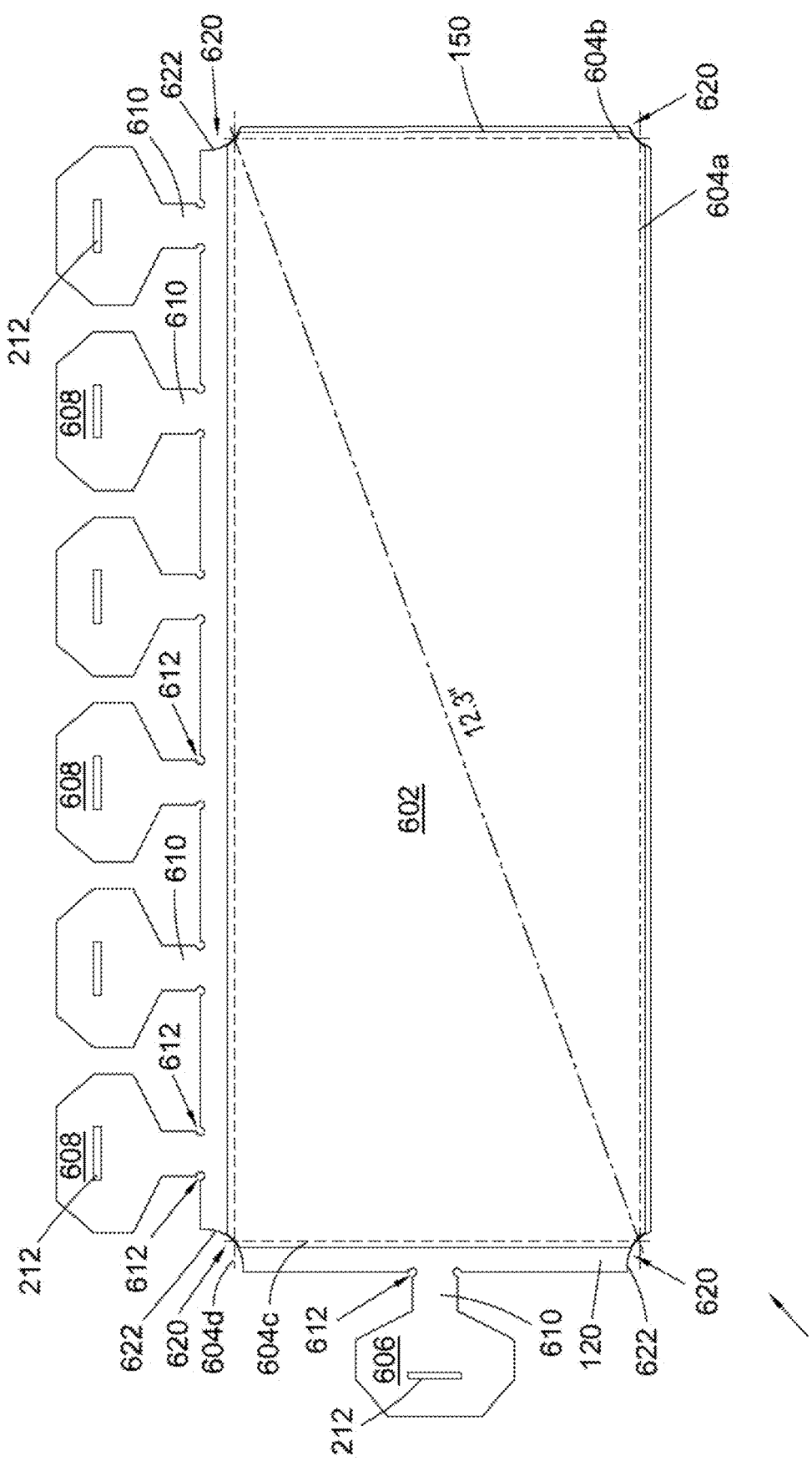
FIG. 6 shows a flexible active matrix LCD display stack.

FIG. 6 shows a flexible active matrix LCD display stack 600 for a zero-bezel display. The active area 150 defines a rectangular display area 602 and extends beyond each of four fold lines 604a-d. Depending upon the implementation the LCD display stack may extend beyond the active area on the flexible substrate 120, as previously described. The flexible active matrix LCD display stack has a notch 620 at each corner of the flat rectangular display area. In the illustrated example, each notch defines a concave contour 622.

The substrate 120 defines a first set of one or more tabs 606 on a first lateral edge of the display area 602 and a second set of one or more tabs 608 on a second, orthogonal lateral edge of the display area 602. Each of the tabs is connected to a region of the flexible substrate 120 via a respective necked region 610 in which a lateral width of the tab diminishes. The tabs 606, 608 may have notches 612 where the necked region joins the flexible substrate. This is useful for stress relief, in particular when the display is curved.

In implementations the tabs 608, 610 may mount drive circuitry such as IGD circuitry, e.g. one or more driver integrated circuits 212. These may be mounted directly onto the substrate, or may be mounted on a stiffer interconnect structure (not shown in FIG. 6), which may also serve to make external electrical connections to the LCD display e.g. via an edge connector.

Figure 7B:
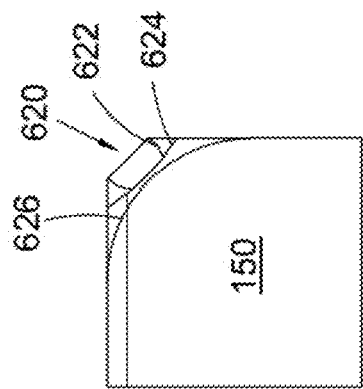
FIGS. 7a and 7b show a zero-bezel LCD display, and an example configuration of a corner of an active area of the LCD display.
Figure 7A:
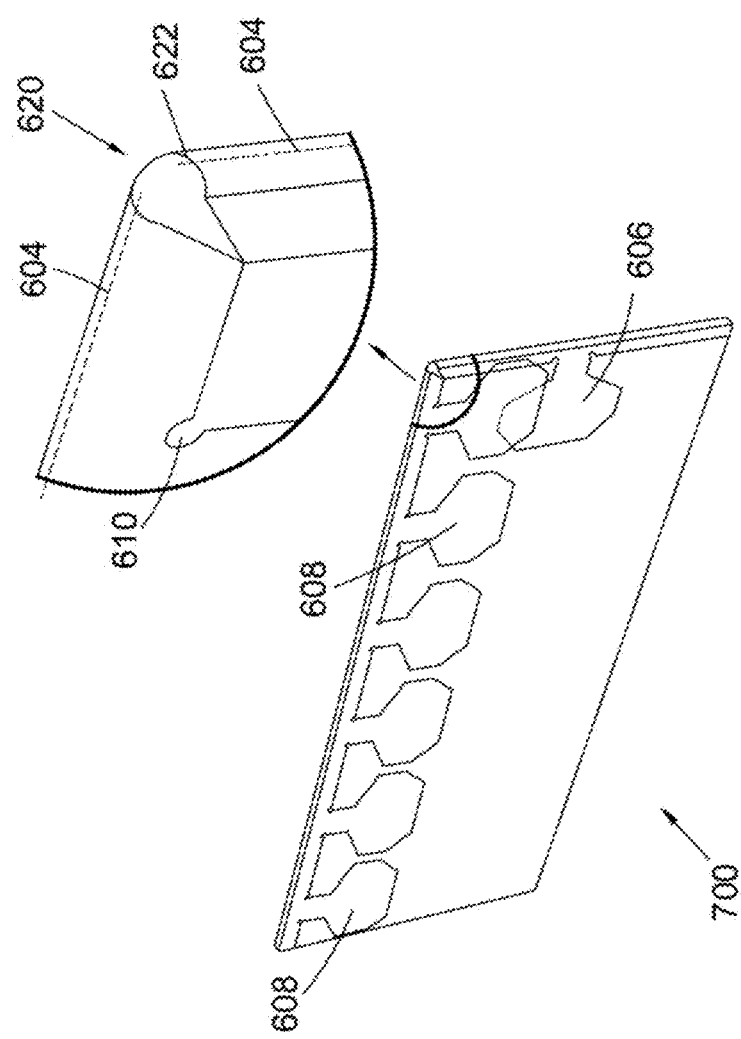

FIG. 7a shows a zero-bezel LCD display 700 with a flat rectangular display area, comprising the flexible active matrix LCD display stack 600 of FIG. 6. The tabs 606, 608 are folded behind the display, which incorporates a backlight (not shown). The inset figure shows details of a corner of the LCD display, illustrating how the active area extends around from a front of the display towards a rear of the display, repeated on all four edges to provide the appearance of an "infinity" display.

FIG. 7b shows an example configuration of a corner of the active area 150. This shows a concave contour 622 defined by a notch, and in the illustrated example a further concave curve 624 defining an edge of the flexible active matrix LCD display stack. A convex curve 626 defines an edge of the active display area at each corner; this may be defined e.g. by an edge of the active matrix TFT circuitry. Such a configuration may also be used with a curved LCD display of the type described later.

Figure 8A:
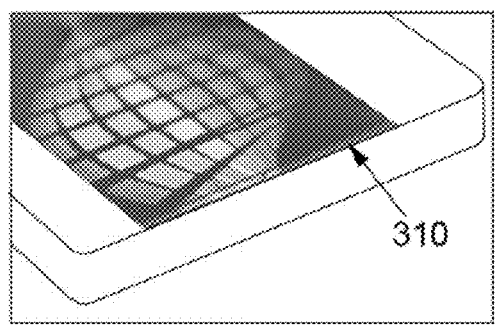
FIGS. 8a and 8b show, respectively, an example of a fabricated, flat, LCD display with a borderless edge, and an example of a zero-bezel LCD display with all the edges borderless.
Figure 8B:
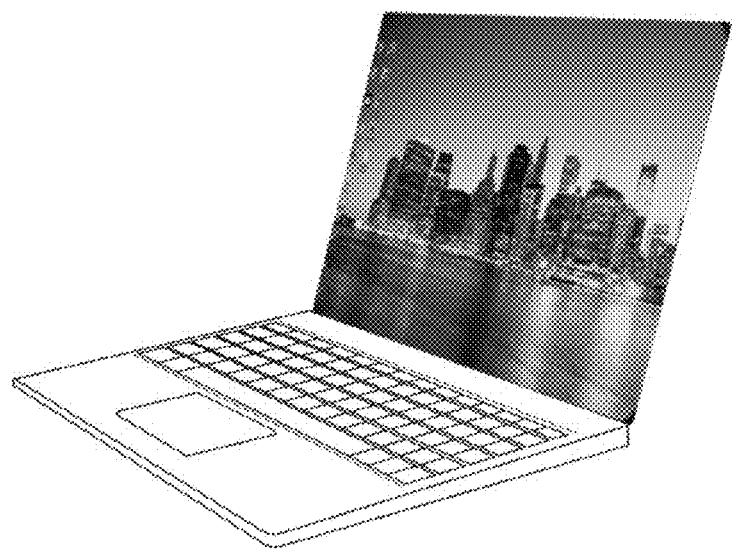

FIG. 8a shows an example of a fabricated display with a structure as shown in FIG. 3b. FIG. 8a shows one edge of the display but the structure of FIG. 3b may be replicated on more than one edge of the display. However, by using the flexible active matrix LCD display stack 600 of FIG. 6, as described with reference to FIG. 7, a "zero-bezel" display may be fabricated in which the active display area extends around each of the e.g. four edges of the display. FIG. 8b shows an example of such a zero-bezel display as described with reference to FIGS. 7a and 7b, by way of illustration incorporated into a laptop.

Figure 9B:
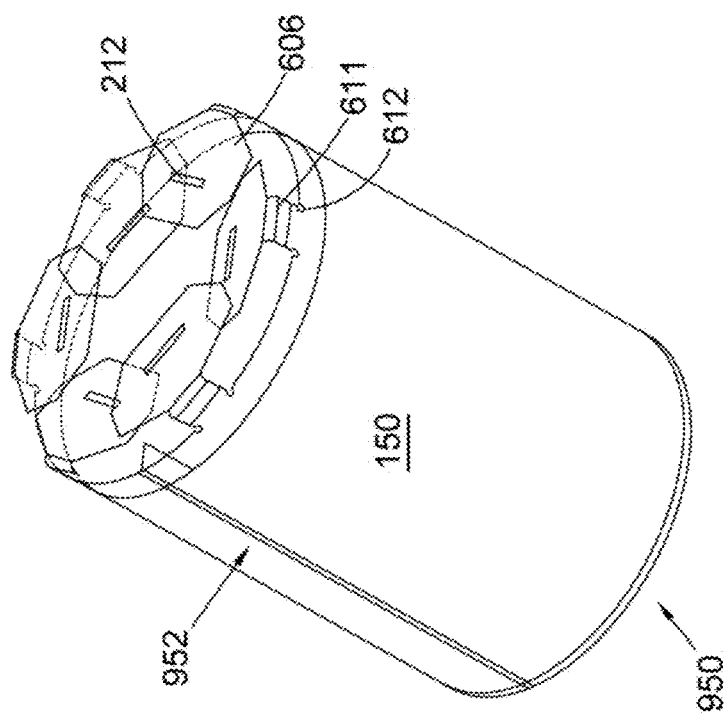
FIGS. 9a-9c show first, second and third examples of curved LCD displays.
Figure 9A:
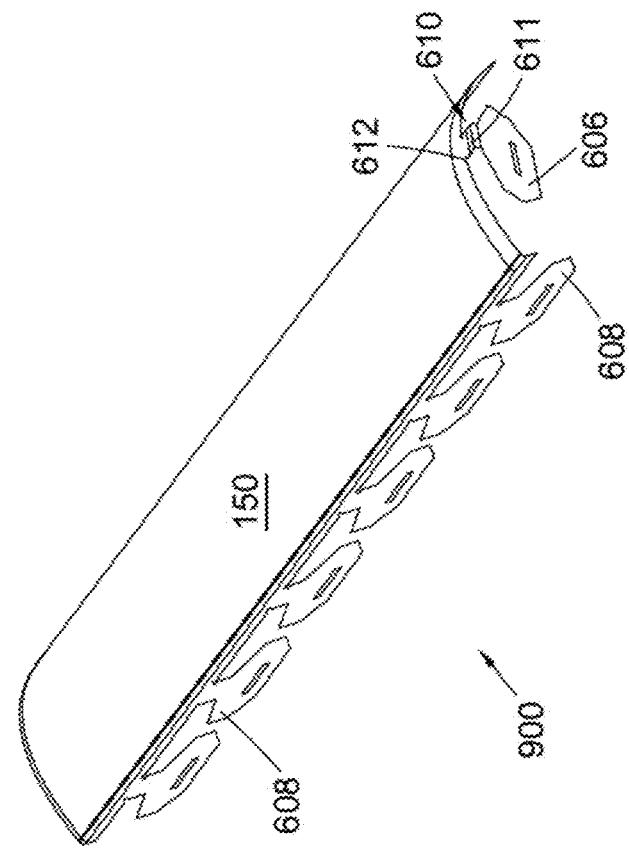

FIG. 9a shows a first example of a flexible LCD display 900 with a curved display area, comprising the flexible active matrix LCD display stack 600 of FIG. 6. In this example, the flexible LCD display stack 600 is curved about an axis parallel to the second lateral edge of the display. The necked region 610 of tab 606, which in this example also includes a compliant structure 611, e.g. a V- or U-shaped fold, facilitates curvature of the display, and the notches 612, and where present, compliant structure, relieve stress.

FIG. 9b shows a second example of a flexible LCD display 950 with a curved display area, comprising the flexible active matrix LCD display stack 600 of FIG. 6. In this example the flexible LCD display stack 600 is curved about an axis parallel to the first lateral edge of the display. Opposite edges of the display meet at a line 952. In implementations the active display area is folded as previously described and extends around each of the two opposing edges. In this way the two opposite edges of the active display area may abut along line 952 to create a substantially seamless display. The use of multiple tabs 608, each with a respective necked region 610, in the example each including a compliant structure 611, facilitates achieving sufficient bend radius for a cylindrical display.

The necked regions 610 carry interconnects from external electrical connections to the display; mounting the drive circuitry on the tabs reduces a number of connections each necked region carries. External electrical connections to the drive circuitry on the tabs may be made in any convenient manner. For example, depending upon the bend radius and number of connections, each tab may mount, directly or indirectly, an edge connector to a common printed circuit board which may be centrally located at one end of the cylindrical LCD display.

Figure 9C:
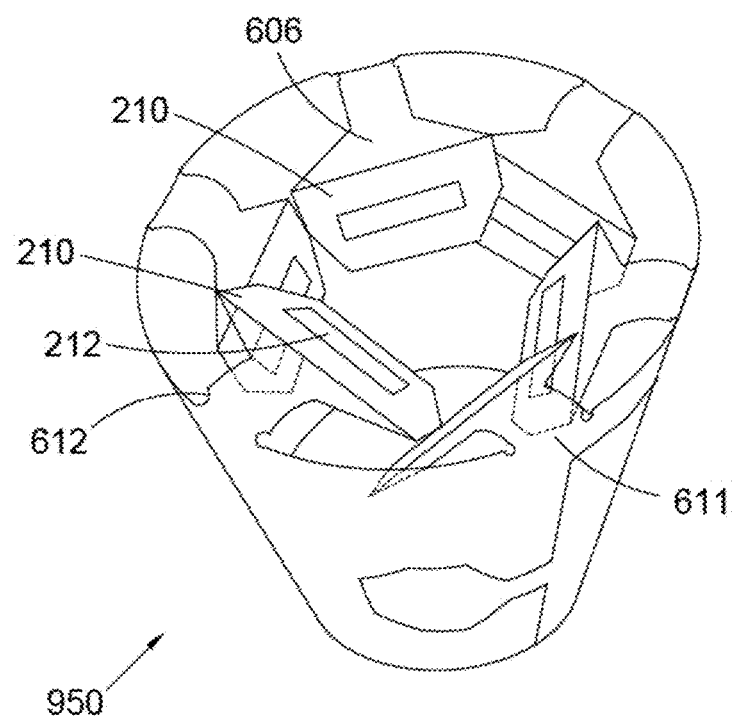

FIG. 9c shows a similar flexible LCD display 950 to that of FIG. 9b, in which the driver circuitry is mounted on stiffer interconnect structures 210 which are themselves mounted on tabs 606, and which may each carry a respective edge connector.

The arrangements if FIGS. 9b and 9c may be used e.g. for a display on a smart speaker.

In general the zero-bezel and curved LCD displays described herein may be used e.g. in any consumer electronic device, or a land, sea, or air vehicle e.g. an automobile, or in equipment of any sort.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. An LCD display, comprising:
   an active display area;
   a backlight to illuminate the active display area;
   an LCD display stack comprising a substrate, a liquid crystal layer over the substrate, and a liquid crystal cover layer, wherein the substrate, the liquid crystal layer, and the liquid crystal cover layer define a liquid crystal cell, and wherein the LCD display stack has an edge seal extending between the substrate and the liquid cover layer;
   wherein the LCD display stack extends over the active display area and beyond the active display area to bend around an edge of the backlight; and
   wherein the edge seal lies beyond the active display area, and wherein the edge seal lies behind the backlight, and wherein the LCD display stack is attached to a rear of the backlight by an adhesive layer, and
   an integrated gate drive (IGD) circuitry, wherein the IGD circuitry is mounted on the substrate, and wherein the edge seal, adhesive layer, and IGD circuitry overlap.

2. An LCD display as claimed in claim 1, wherein the LCD cell bends around an edge of the backlight.

3. An LCD display as claimed in claim 1, wherein the IGD circuitry is displaced away from the active display area, and wherein electrical connections between the IGD circuitry and the active display area comprise a stack of electrically conducting layers including at least a first, compliant layer of first metal and a second protective layer of second metal, wherein a compliance of the first metal is greater than a compliance of the second metal, and wherein an oxidation resistance of the second metal is greater than an oxidation resistance of the first metal; and/or
   wherein the LCD display having electrical connections between the IGD circuitry and the active display area, each of the electrical connections being configured to fan out into multiple connections over the bend; and/or
   further comprising one or more encapsulation layers to encapsulate the liquid crystal cell, wherein the one or more encapsulation layers extend over the active display area and beyond the active display area to bend around an edge of the backlight; and/or
   wherein the LCD display stack is embedded in an encapsulation material where the LCD display stack bends around the edge of the backlight.

4. An LCD display as claimed in claim 1, wherein the LCD display stack has a light-blocking layer which is substantially continuous over a region of the LCD display stack where the LCD display stack bends around an edge of the backlight, to inhibit light from the backlight leaking out; and
   optionally wherein the backlight lacks an adhesive joint to the display stack along the bend; and/or
   further comprising a backlight tray to hold the backlight, wherein the LCD display stack bends around and abuts an edge of the backlight tray; and/or
   further comprising a backlight tray to hold the backlight, wherein the LCD display stack bends around an edge of the backlight tray, and wherein the backlight tray is configured to absorb sufficient light from the backlight at the edge of the backlight tray that the display lacks a bright edge.

5. An LCD display as claimed in claim 1, further comprising a backlight tray to hold the backlight, wherein the LCD display stack bends around an edge of the backlight tray, and wherein the backlight tray is refractive index matched to the backlight and/or an interface between the backlight tray and the backlight incorporates a refractive index material; or
   further comprising a backlight tray to hold the backlight, wherein the LCD display stack bends around an edge of the backlight tray, wherein the backlight is an edge-lit backlight and includes a light guide to distribute light from an edge of the light guide over the active display area, and wherein the light guide and backlight tray are integrally formed.

6. An LCD display as claimed in claim 1, wherein a radius of the bend decreases around the bend from the active display area towards a rear of the display, and wherein an edge of the backlight or, where present of a backlight tray, conforms to the bend; and/or
   wherein the LCD display is rectangular, wherein the LCD display stack bends around at least two adjacent lateral edges of the rectangle, and wherein the LCD display stack is notched at one or more corners defined by the at least two adjacent lateral edges of the rectangle.

7. A zero-bezel LCD display configured to provide a flat display area with all display edges borderless such that displayed information is able to extend over all of the display edges, the LCD display comprising:
   a flexible active matrix LCD display stack comprising a flexible substrate bearing active matrix circuitry comprising an array of TFTs (thin film transistors) for controlling pixels of the display, a liquid crystal layer over the substrate, and a liquid crystal cover layer, wherein the flexible substrate, the liquid crystal layer, and the liquid crystal cover layer define a liquid crystal cell, and wherein the flexible active matrix LCD display stack defines an active display area; and
   a backlight behind the flexible active matrix LCD display stack to illuminate the active display area; and
   wherein the flexible substrate of the flexible active matrix LCD display stack is notched at each corner of the flat display area and is folded around each of the edges of the flat display area such that the active display area extends around each of the edges of the flat display area of the zero-bezel LCD display, and
   an integrated gate drive (IGD) circuitry, wherein the IGD circuitry is displaced away from the active display area, and wherein electrical connections between the IGD circuitry and the active display area comprise a stack of electrically conducting layers including at least a first, compliant layer of first metal and a second protective layer of second metal, wherein a compliance of the first metal is greater than a compliance of the second metal, and wherein an oxidation resistance of the second metal is greater than an oxidation resistance of the first metal.

8. The LCD display of claim 7, wherein the notches in the flexible substrate at the corners of the flat display area define a concave contour which cuts off each corner of the flat display area, and wherein an edge of the active display area at each corner defines a convex curve on the flat display area which is displaced away from the concave contour at a point of closest approach of the concave contour and convex curve; and/or wherein the display area is rectangular with four display edges.

9. The LCD display of claim 7, wherein the flexible active matrix LCD display stack has an edge seal extending between the substrate and the liquid cover layer, wherein the edge seal of the flexible active matrix LCD display stack lies beyond the active display area; and
optionally wherein the LCD cell bends around an edge of the backlight, and wherein the edge seal lies behind the backlight; and
optionally wherein the LCD display stack is attached to a rear of backlight by an adhesive layer, wherein the edge seal and adhesive layer overlap; and
optionally further comprising integrated gate drive (IGD) circuitry, wherein the IGD circuitry is mounted on the flexible substrate, and wherein the edge seal, adhesive layer, and IGD circuitry overlap.

10. The LCD display of claim 7, wherein the flexible substrate extends laterally beyond the flexible active matrix LCD display stack to define one or more tabs at each of two edges of the flat display area; and wherein the IGD circuitry is mounted on each of the one or more tabs; and
optionally wherein each of the one or more tabs is connected to a region of the flexible substrate in the active display area via a necked region in which a lateral width of the tab diminishes.

11. The LCD display of claim 7, the LCD display having electrical connections between the IGD circuitry and the active display area, each of the electrical connections being configured to fan out into multiple connections over the bend; and/or
further comprising one or more encapsulation layers to encapsulate the liquid crystal cell, wherein the one or more encapsulation layers extend over the active display area and beyond the active display area to bend around an edge of the backlight; and/or
wherein the LCD display stack is embedded in an encapsulation material where the LCD display stack bends around the edge of the backlight.

12. The LCD display of claim 7, wherein the LCD display stack has a light-blocking layer which is substantially continuous over a region of the LCD display stack where the LCD display stack bends around an edge of the backlight, to inhibit light from the backlight leaking out; and
optionally wherein the backlight lacks an adhesive joint to the display stack along the bend; and/or
further comprising a backlight tray to hold the backlight, wherein the LCD display stack bends around and abuts an edge of the backlight tray; and/or
further comprising a backlight tray to hold the backlight, wherein the LCD display stack bends around an edge of the backlight tray, and wherein the backlight tray is configured to absorb sufficient light from the backlight at the edge of the backlight tray that the display lacks a bright edge.

13. The LCD display of claim 7, further comprising a backlight tray to hold the backlight, wherein the LCD display stack bends around an edge of the backlight tray, and wherein the backlight tray is refractive index matched to the backlight and/or an interface between the backlight tray and the backlight incorporates a refractive index material; or
further comprising a backlight tray to hold the backlight, wherein the LCD display stack bends around an edge of the backlight tray, wherein the backlight is an edge-lit backlight and includes a light guide to distribute light from an edge of the light guide over the active display area, and wherein the light guide and backlight tray are integrally formed; and/or
wherein a radius of the bend decreases around the bend from the active display area towards a rear of the display, and wherein an edge of the backlight or, where present of a backlight tray, conforms to the bend.

14. A flexible LCD display to provide a curved display area, the curved display area having display edges, the flexible LCD display comprising:
a flexible active matrix LCD display stack comprising a flexible substrate bearing active matrix circuitry comprising an array of TFTs (thin film transistors) for controlling pixels of the display, a liquid crystal layer over the substrate, and a liquid crystal cover layer, wherein the flexible substrate, the liquid crystal layer, and the liquid crystal cover layer define a liquid crystal cell, wherein the flexible active matrix LCD display stack has an edge seal extending between the substrate and the liquid cover layer, and wherein the flexible active matrix LCD display stack defines an active display area; and
drive circuitry for driving the active matrix circuitry;
wherein the flexible substrate extends laterally beyond the flexible active matrix LCD display stack to define one or more tabs at each of two adjacent edges of the curved display area;
wherein the drive circuitry is mounted on each of the one or more tabs; and
wherein each of the one or more tabs is connected to a region of the flexible substrate in the active display area via a necked region in which a lateral width of the tab diminishes.

15. The LCD display of claim 14, wherein the flexible substrate defines a plurality of tabs at a first of the two adjacent edges, wherein the first of the edges is curved, and wherein the flexible active matrix LCD display stack is curved about an axis parallel to a second of the two adjacent edges; and
optionally wherein, for at least the tabs at the first of the two adjacent edges, the necked region includes a compliant structure and has notches at corners where the necked region joins the flexible substrate.

16. The LCD display of claim 14, wherein the flexible active matrix LCD display stack is curved to define a cylindrical display; and
optionally wherein the active display area is rectangular, wherein the flexible active matrix LCD display stack is curved such that two opposite edges of the active display area abut along a line parallel to the axis, and wherein the LCD display stack is notched at each end of one or both of the two opposite edges and folded around respectively one or both of the two opposite edges; and
optionally wherein the LCD display stack is notched at each end of both the two opposite edges and folded around both of the two opposite edges such that the active display area abuts along the opposite edges to define a substantially continuous active display area extending around a circumference of the cylindrical display.

17. The LCD display of claim 14, wherein the drive circuitry comprises one or more integrated circuits; and further comprising a rigid interconnect structure mounted on each of the tabs bearing the one or more integrated circuits and having an edge connector for making an external electrical connection to the LCD display; and/or wherein electrical connections between the drive circuitry and the active matrix circuitry comprise, in the necked region, a stack of electrically conducting layers including at least a first, compliant layer of first metal and a second protective layer of second metal, wherein a compliance of the first metal is greater than a compliance of the second metal, and wherein an oxidation resistance of the second metal is greater than an oxidation resistance of the first metal; and/or wherein one or more electrical connections between the drive circuitry and the active matrix circuitry are configured to fan out into multiple connections in the necked region.

18. The LCD display of claim 14, wherein the flexible active matrix LCD display stack is curved about an axis; further comprising a backlight behind the flexible active matrix LCD display stack to illuminate the active display area, wherein the backlight is curved to confirm to the curvature of the flexible active matrix LCD display stack; and optionally wherein the LCD cell bends around an edge of the backlight, and wherein the edge seal lies behind the backlight; and optionally wherein the LCD display stack is attached to a rear of backlight by an adhesive layer, wherein the edge seal and adhesive layer overlap; and/or wherein the LCD display stack is embedded in an encapsulation material where the LCD display stack bends around the edge of the backlight.

19. The LCD display of claim 14, wherein the LCD display stack has a light-blocking layer which is substantially continuous over a region of the LCD display stack where the LCD display stack bends around an edge of the backlight, to inhibit light from the backlight leaking out; and/or wherein the edge seal of the flexible active matrix LCD display stack lies beyond the active display area; and/or further comprising one or more encapsulation layers to encapsulate the liquid crystal cell, wherein the one or more encapsulation layers extend over the active display area and beyond the active display area to bend around an edge of the backlight.

* * * * *